(12) United States Patent
Ho et al.

(10) Patent No.: US 10,331,261 B2
(45) Date of Patent: Jun. 25, 2019

(54) TOUCH PANEL

(71) Applicant: TPK Touch Solutions (Xiamen) Inc., Xiamen (CN)

(72) Inventors: Kwan-Sin Ho, Miaoli (TW); Xiao-Xia You, Fujian (CN); Jun-Ping Yang, Fujian (CN); Hua Yun, Fujian (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 180 days.

(21) Appl. No.: 15/336,788

(22) Filed: Oct. 28, 2016

(65) Prior Publication Data

US 2017/0123576 A1 May 4, 2017

(30) Foreign Application Priority Data

Oct. 29, 2015 (CN) .......................... 2015 1 0723975

(51) Int. Cl.
*G06F 3/041* (2006.01)
*G06F 3/045* (2006.01)
*G06F 3/044* (2006.01)

(52) U.S. Cl.
CPC ............ *G06F 3/0416* (2013.01); *G06F 3/044* (2013.01); *G06F 3/045* (2013.01); *G06F 2203/04107* (2013.01); *G06F 2203/04111* (2013.01)

(58) Field of Classification Search
CPC . G06F 2203/04107; G06F 2203/04111; G06F 3/0416; G06F 3/044; G06F 3/045
See application file for complete search history.

(56) References Cited

U.S. PATENT DOCUMENTS

| 5,579,036 | A | * | 11/1996 | Yates, IV | ................ | G06F 3/044 |
| | | | | | | 178/18.06 |
| 2013/0113711 | A1 | * | 5/2013 | Nien | .................... | H05K 9/0067 |
| | | | | | | 345/173 |
| 2014/0367242 | A1 | * | 12/2014 | Chen | .................. | H03K 17/9622 |
| | | | | | | 200/600 |

* cited by examiner

*Primary Examiner* — Ram A Mistry
(74) *Attorney, Agent, or Firm* — Cooper Legal Group, LLC

(57) ABSTRACT

A touch panel includes a substrate, a light-shielding element, a touch sensing layer, a discharge element, and a main bridge element. The substrate has a center area and an edge area surrounding the center area. The light-shielding element is disposed on the edge area of the substrate. The touch sensing layer is disposed on the substrate and a portion of the touch sensing layer is disposed on the light-shielding element. The discharge element is disposed on the light-shielding element and is separated from the touch sensing layer. The main bridge element is connected to the portion of the touch sensing layer disposed on the light-shielding element and the discharging element.

16 Claims, 7 Drawing Sheets

A

TOUCH PANEL

RELATED APPLICATIONS

This application claims priority to China Application Serial Number 201510723975.1, filed Oct. 29, 2015, which is herein incorporated by reference.

BACKGROUND

Technical Field

The present disclosure relates to a touch panel.

Description of Related Art

In today's consumer electronic market, touch panels have been widely used in portable electronic products to serve as interfacing tools for data communication. In addition, because the current design of electronic products tends to be slim and light-weight, there is not sufficient space in the products to accommodate traditional input devices, such as a keyboard, a mouse, etc. In particular, as driven by the demand for tablet personal computers (PCs) that emphasize a user-friendly design, touch panels have emerged as one of the key components.

With the touch panels gradually becoming slim and light-weight, a sensor in a touch panel includes a sensing electrode and a wire connected to the sensing electrode. The wire is located in the periphery of the sensing electrode. If the touch panel does not have an adequate electrostatic discharge (ESD) protection mechanism, the sensing electrode is vulnerable to electrostatic breakdown, which in turn leads to a broken electrode or a deteriorated conductivity. As a result, the operation and lifetime of machines thus assembled are affected.

SUMMARY

Since a light-shielding element is easily carbonized during the manufacturing process to cause an uneven electrical resistance distribution, sensing electrodes on the light-shielding element tends to break down due to the electrostatic charges generated on the light-shielding element. An aspect of the present disclosure is to provide a touch panel. The touch panel comprises a substrate, a light-shielding element, a touch sensing layer, a discharge element, and a main bridge element. The substrate has a center area and an edge area. The edge area surrounds the center area. The light-shielding element is disposed on the edge area of the substrate. The touch sensing layer is disposed on the substrate, and a portion of the touch sensing layer is disposed on the light-shielding element. The discharge element is disposed on the light-shielding element and is separated from the touch sensing layer. The main bridge element is connected the portion of the touch sensing layer disposed on the light-shielding element and the discharge element.

In at least one embodiment, the touch panel further includes a shielding layer disposed on the light-shielding element. The shielding layer surrounds the discharge element and is spaced apart from the discharge element by a gap. The main bridge element is electrically insulated from the shielding layer.

In at least one embodiment, the touch panel further includes an insulating layer disposed between the main bridge element and the shielding layer.

In at least one embodiment, a plurality of the discharge elements are separated from one another. The touch panel further includes a sub bridge element connecting two of the discharge elements.

In at least one embodiment, the main bridge element and the sub bridge element are connected in series to connect the discharge elements.

In at least one embodiment, the touch panel further includes a shielding layer disposed on the light-shielding element. The shielding layer surrounds one of the discharge elements and is spaced apart from the one of the discharge elements by a gap. Both the main bridge element and the sub bridge element are electrically insulated from the shielding layer.

In at least one embodiment, the touch panel further includes an insulating layer disposed between the sub bridge element and the shielding layer.

In at least one embodiment, a plurality of the shielding layers respectively surround the discharge elements.

In at least one embodiment, two of the discharge elements are separated from each other and are respectively connected to two opposite ends of the main bridge element.

In at least one embodiment, the touch sensing layer includes a first sensing unit extending along a first direction. The main bridge element is connected to one end of the first sensing unit.

In at least one embodiment, the first sensing unit includes a plurality of sensing pads and a plurality of connection elements. The main bridge element is connected to the sensing pad located at the one end of the first sensing unit. Each of the connection elements connects the sensing pads and the connection elements and the sensing pads are arranged alternately.

In at least one embodiment, the sensing pad and the discharge element are made of a same material and formed in a same process.

In at least one embodiment, the touch panel further includes a wire disposed on the light-shielding element and connected to the sensing pad located at the one end.

In at least one embodiment, the touch sensing layer further includes a second sensing unit extending along a second direction. The second direction intersects the first direction.

In at least one embodiment, the discharge element is a conducting layer.

In at least one embodiment, the shielding layer is a conducting layer.

The touch panel according to the above embodiments can reduce the chance that the touch sensing layer breaks down due to the electrostatic charges generated on the light-shielding element. As a result, the damage of electrostatic charges on the touch sensing layer is reduced.

DESCRIPTION OF THE EMBODIMENTS

In the following detailed description, for purposes of explanation, numerous specific details are set forth in order to provide a thorough understanding of the disclosed embodiments. It will be apparent, however, that at least one embodiment may be practiced without these specific details. In other instances, well-known structures and elements are schematically depicted in order to simplify the drawings.

Figure 1:
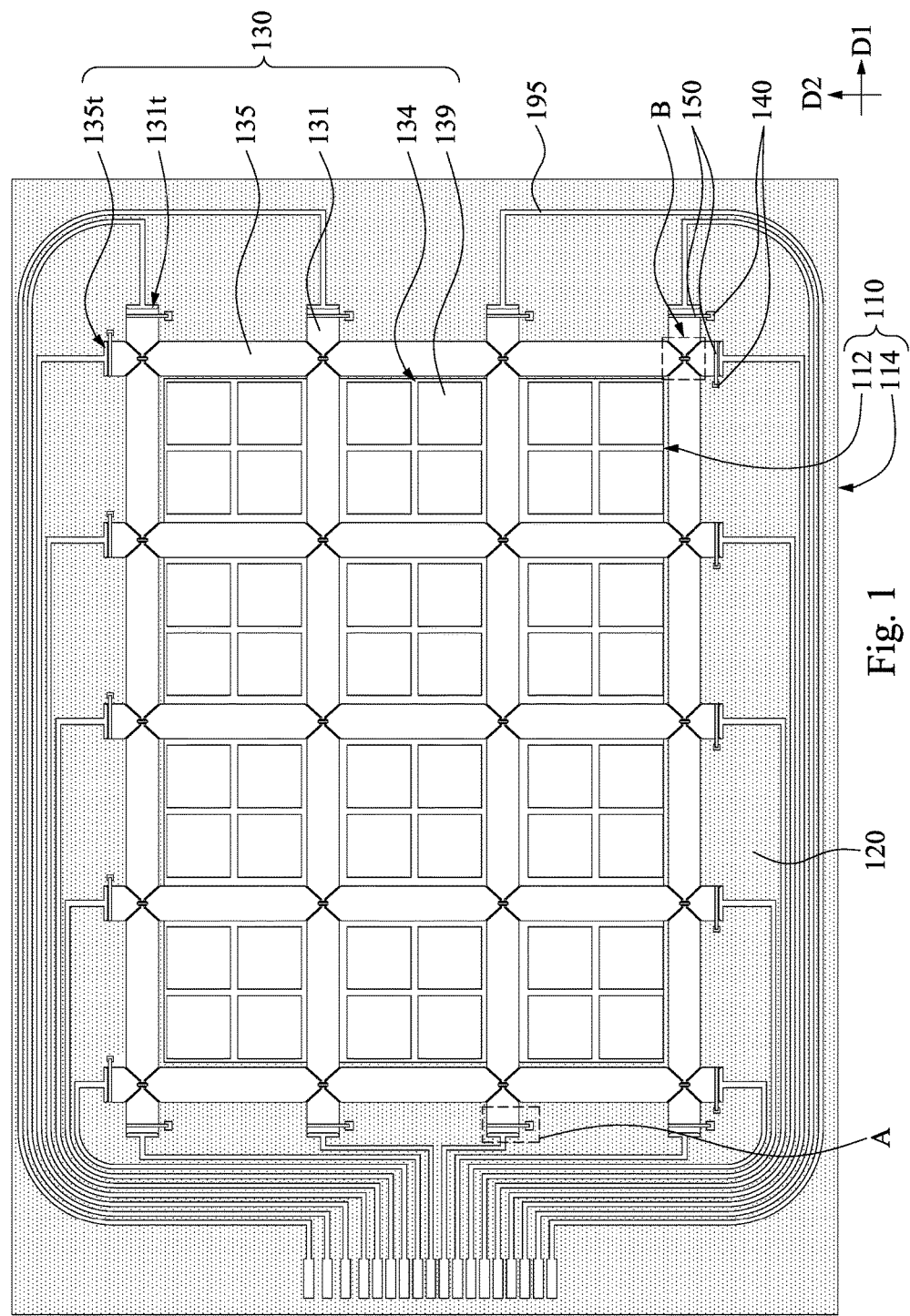
FIG. 1 is a top view of a touch panel according to at least one embodiment of the present disclosure.
Figure 2A:
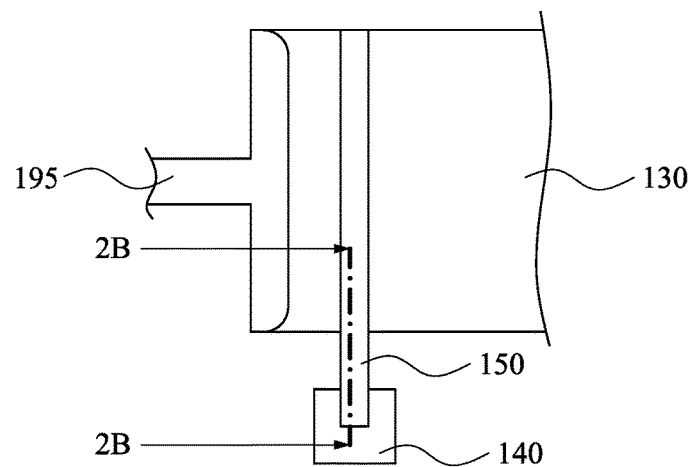
FIG. 2A is a partial enlarged view of an area A in FIG. 1.
Figure 2B:
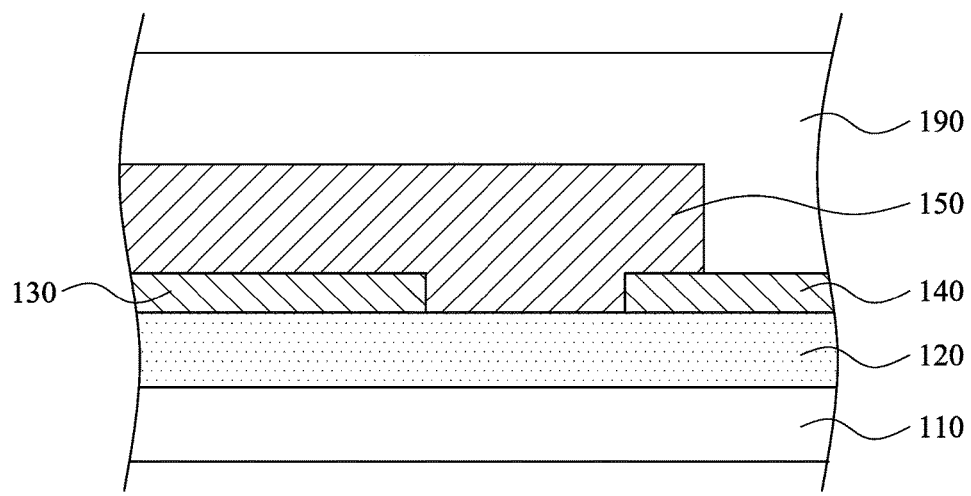
FIG. 2B is a cross-sectional view taking along line 2B-2B of FIG. 2A.

FIG. 1 is a top view of a touch panel according to one embodiment of the present disclosure. FIG. 2A is a partial enlarged view of an area A in FIG. 1. FIG. 2B is a cross-sectional view taking along line 2B-2B of FIG. 2A. As shown in the figures, the touch panel includes a substrate 110, a light-shielding element 120, a touch sensing layer 130, discharge elements 140, and main bridge elements 150. The substrate 110 has a center area 112 and an edge area 114 surrounding the center area 112. The light-shielding element 120 is disposed on the substrate 110 to define the edge area 114. The touch sensing layer 130 is disposed on the substrate 110 and a portion of the touch sensing layer 130 is disposed on the light-shielding element 120. The discharge elements 140 are disposed on the light-shielding element 120 and are separated from the touch sensing layer 130. The main bridge element 150 is connected to the portion of the touch sensing layer 130 disposed on the light-shielding element 120 and the discharge element 140.

In some embodiment, the center area 112 of the substrate 110 is a visible area of the touch panel, and the edge area 114 is a non-visible area of the touch panel. The touch sensing layer 130 may be connected to circuits in the edge area 114 so as to electrically connect external circuits. However, the boundary between the above center area 112 and edge area 114 is for illustrative purposes only, and the present disclosure is not limited in this regard. In addition, the light-shielding element 120 is, for example, a black matrix (BM), which is able to hide the circuits in the edge area 114 so as to retain the aesthetic appearance of the touch panel.

In brief, the touch panel according to the present embodiment can reduce the chance of electrostatic breakdown of the touch sensing layer 130 so as to reduce the damage of electrostatic charges on the touch sensing layer 130. In greater detail, because of a material of the light-shielding element 120 itself (such as an organic material, ink, etc.) according to the present embodiment, the portion of the touch sensing layer 130 which is disposed on the light-shielding element 120 has a higher electrical resistance. The higher electrical resistance together with the influences of process factors may cause an uneven electrical resistance distribution. For example, part of the region is carbonized so as to result in a higher electrical resistance in those regions and a lower electrical resistance in the other regions. Additionally, one side of the light-shielding element 120 close to the center area 112 of the substrate 110 (that is, the junction of the edge area 114 and the center area 112) has a height difference, which in turn causes a non-uniform thickness of the touch sensing layer 130 at the junction. Typically, the touch sensing layer 130 has a thinner thickness at the junction than the touch sensing layer 130 on the substrate. As a result, the touch sensing layer 130 has a higher electrical resistance at the junction. Overall speaking, the electrical resistance of the portion of the touch sensing layer 130 on the light-shielding element 120 tends to increase. If there are unexpected electrostatic charges accumulating, the circuit of the touch sensing layer 130 on the light-shielding element 120 breaks easily to cause a signal interruption or a short circuit, or even cause a malfunction of the touch sensing layer 130.

However, in the present embodiment, a potential difference is generated between the touch sensing layer 130 and the discharge element 140 because the main bridge element 150 establishes a connection between the portion of the touch sensing layer 130 disposed on the light-shielding element 120 and the discharge element 140. Even though electrostatic charges hit the portion of the touch sensing layer 130 on the light-shielding element 120, the resulting electrical current is able to rapidly flow to the discharge element 140 having a lower potential along the main bridge element 150 so as to avoid damage to the touch sensing layer 130 by the electrostatic charges. In addition, since the current has flowed to the discharge element 140, the possibility that the touch sensing layer 130 located between the edge area 114 and the center area 112 is damaged by the electrostatic charges is also reduced.

In at least the present embodiment, the discharge element 140 is a conducting layer, which, for example, can be formed from a same conducting layer as the touch sensing layer 130. For example, a conducting layer (e.g. a transparent conductive layer, such as indium tin oxide (ITO)) can be deposited on the substrate 110 and the light-shielding element 120 first, then the conducting layer is patterned to simultaneously form the discharge element 140 and the touch sensing layer 130. However, in other embodiments, the discharge element 140 and the touch sensing layer 130 may be made of different materials or by different processes. In addition, the discharge element 140 in FIG. 2A is in a square shape. However, in other embodiments, the discharge element 140 is in other shapes, such as a circular shape or a polygonal shape.

In FIG. 2B, the main bridge element 150 is disposed on the discharge element 140 and the touch sensing layer 130. That is, the discharge element 140 and the touch sensing layer 130 are disposed between the main bridge element 150 and the light-shielding element 120. A material of the main bridge element 150 is, for example, metal, but the present disclosure is not limited in this regard. In some other embodiments, the main bridge element 150 is disposed underneath the discharge element 140 and the touch sensing layer 130. That is, the main bridge element 150 is disposed between the discharge element 140 and the light-shielding element 120 and disposed between the touch sensing layer 130 and the light-shielding element 120. Basically, any embodiment in which the main bridge element 150 is electrically connected to the discharge element 140 and the touch sensing layer 130 is contemplated herein.

In at least one embodiment, the touch panel further includes a protective layer 190 covering all elements on the substrate 110 (that is, the light-shielding element 120, the touch sensing layer 130, the discharge elements 140, the main bridge elements 150, and other circuits). Specifically, the protective layer 190 is disposed on the light-shielding element 120, the touch sensing layer 130, the discharge elements 140, the main bridge elements 150, and the other circuits.

Reference is made to FIG. 1. In at least one embodiment, the touch sensing layer 130 includes first sensing units 131 extending along a first direction D1. The main bridge elements 150 are connected to (or disposed at) ends 131t of the first sensing units 131. For example, the touch panel includes more than one the main bridge elements 150 and the discharge elements 140 in accordance with at least one embodiment. The touch sensing layer 130 includes four first sensing units 131. The two opposite ends 131t of each of the first sensing units 131 are both connected to the main bridge elements 150. Hence, once electrostatic charges hit any of the first sensing units 131, the main bridge element 150 connected to the first sensing unit 131 is capable of conducting the current to the discharge element 140 correspondingly.

Additionally, the touch sensing layer 130 further includes second sensing units 135 extending along a second direction D2. The second direction D2 intersects the first direction D1 (e.g., the second direction D2 is substantially perpendicular to the first direction D1). The other main bridge elements 150 are connected to (or disposed at) ends 135t of the second sensing units 135. For example, the touch sensing layer 130 includes five second sensing units 135, and the two opposite ends 135t of each of the second sensing units 135 are both connected to the main bridge elements 150 according to at least one embodiment. Hence, once electrostatic charges hit any of the second sensing units 135, the main bridge element 150 connected to the second sensing unit 135 is capable of conducting the current to the discharge element 140 correspondingly.

The above description is for illustrative purposes only. In other embodiments, any configuration in which at least one of the ends 131t or 135t is connected to the main bridge element 150 and the discharge element 140. The more the number of the ends 131t and 135t that connect the main bridge elements 150 to the discharge elements 140, the better the effect of preventing the electrostatic breakdown of the touch sensing layer 130.

Figure 3A:
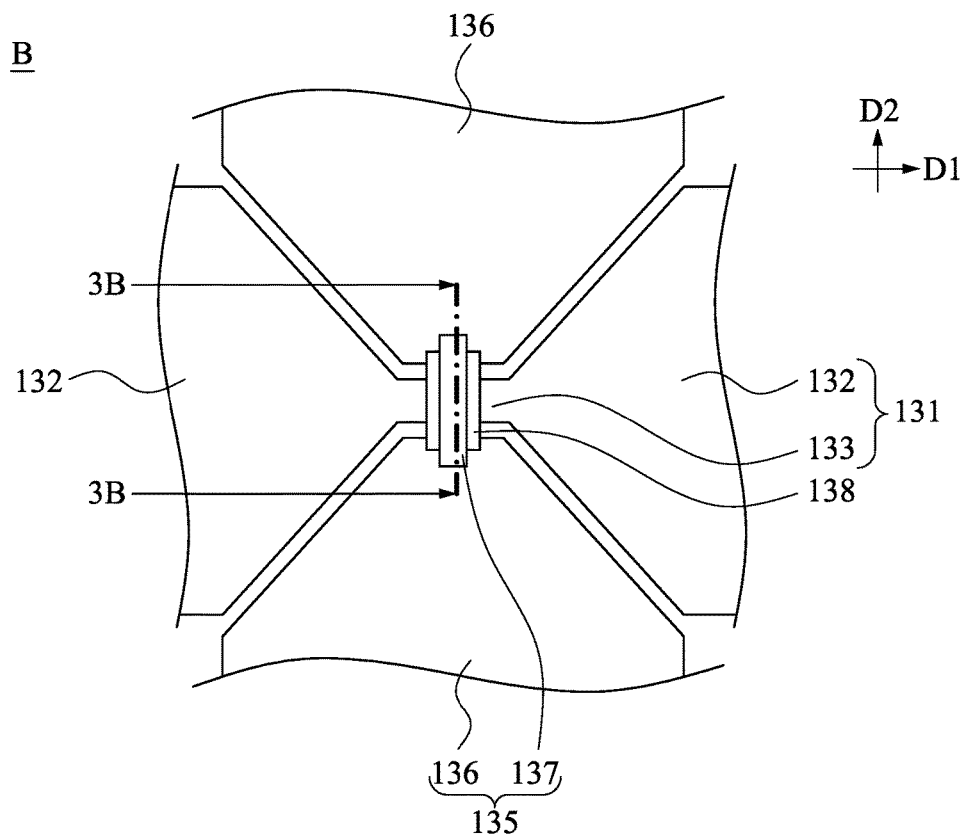
FIG. 3A is a partial enlarged view of an area B in FIG. 1.

Reference is made to FIG. 1 and FIG. 3A. FIG. 3A is a partial enlarged view of an area B in FIG. 1. According to at least one embodiment, the first sensing unit 131 includes a plurality of sensing pads 132 and a plurality of connection elements 133. The main bridge elements 150 are connected to the sensing pads 132 located at the ends 131t of the first sensing unit 131. The connection elements 133 are respectively connected to the sensing pads 132, and the connection elements 133 and the sensing pads 132 are arranged alternately along the first direction D1. In at least one embodiment, the sensing pads 132 are, for example, striped-shaped, and the connection element 133 connects the two adjacent sensing pads 132. The sensing pads 132 and the connection elements 133 may be, for example, integrally formed, or the sensing pads 132 and the connection element 133 may be made of different material. The present disclosure is not limited in this regard.

Figure 3B:
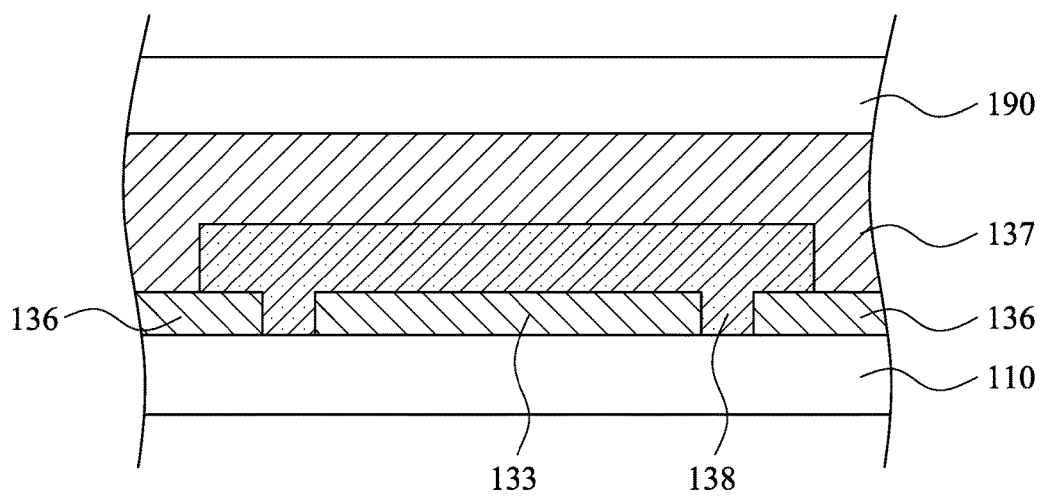
FIG. 3B is a cross-sectional view taking along line 3B-3B of FIG. 3A.

Additionally, reference is made to FIG. 1, FIG. 3A, and FIG. 3B. FIG. 3B is a cross-sectional view taken along line 3B-3B of FIG. 3A. According to at least one embodiment, the second sensing unit 135 includes a plurality of sensing pads 136 and a plurality of connection elements 137. The main bridge elements 150 are connected to the sensing pads 136 located at the ends 135t of the second sensing unit 135. The connection elements 137 are respectively connected to the sensing pads 136, and the connection elements 137 and the sensing pads 136 are arranged alternately along the second direction D2. In at least one embodiment, the sensing pads 136 are, for example, striped-shaped, and the connection element 137 connects the two adjacent sensing pads 136. The connection elements 137 intersect the connection elements 133, such that the touch sensing layer 130 can further include an insulating element 138 disposed between the connection elements 137 and 133 to isolate the connection elements 137 from the connection elements 133. More specifically, the insulating element 138 is disposed on top of the connection elements 133, and the connection elements 137 are disposed on top of the insulating element 138 to bridge the two adjacent sensing pads 136. In some embodiments, the insulating element 138 may be made of polyimide (PI) or some other suitable material. A material of the connection elements 137 may be metal. The connection elements 137 and the main bridge elements 150 may be formed in a same process.

Reference is made to FIG. 1. In at least one embodiment, the first sensing units 131 and the second sensing units 135 intersect each other to define a plurality of opening areas 134. Each of the opening areas 134 is free of the sensing pads 132, 136 (as shown in FIG. 3A) and the connection elements 133, 137 (as shown in FIG. 3A). In order to match the refractive index of the opening areas 134, the touch sensing layer 130 may further include a plurality of dummy elements 139 disposed in the opening areas 134. The dummy elements 139, the first sensing units 131, and the second sensing units 135 may be made of a same material. Thus, the dummy elements 139, the first sensing units 131, and the sensing pads 136 of the second sensing units 135 may be formed in a same process. The present disclosure is not limited in this regard. In FIG. 1, the pattern and the plural number of the dummy elements 139 are for illustrative purposes only, and the dummy elements 139 may be designed depending on practical situations.

In at least one embodiment, the touch panel further includes wires 195 disposed on the light-shielding element 120 and connected to the sensing pads 132 (136) (as shown in FIG. 3A) located at the ends 131t (135t) so as to serve as connection wires between the touch sensing layer 130 and the external circuits. In some embodiments, the wires 195 and the main bridge elements 150 may be made of a same material, for example, both are made of metal. Thus, the wires 195 and the main bridge elements 150 may be formed in a same process. In FIG. 1, a portion of each of the wires 195 bridges over the touch sensing layer 130 so as to electrically connect the touch sensing layer 130, but the present disclosure is not limited to such a structure.

Figure 4A:
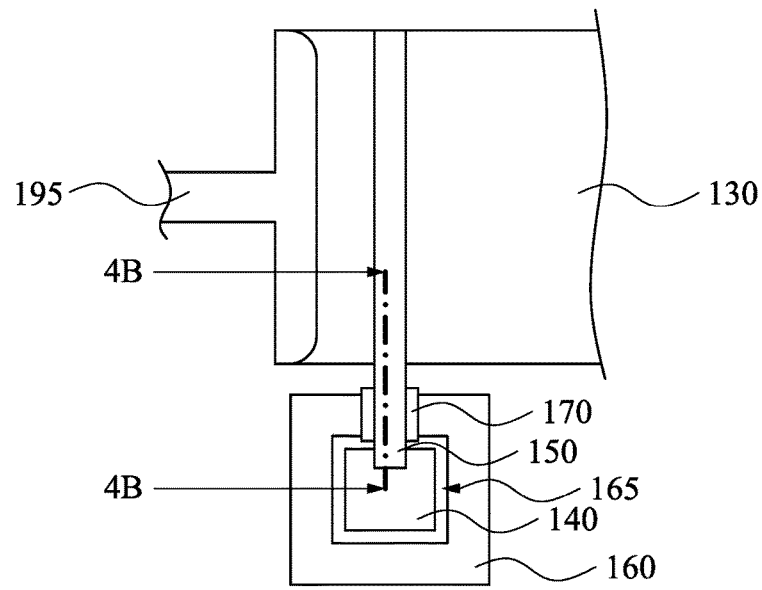
FIG. 4A is a partial enlarged view of a touch panel according to at least another embodiment of the present disclosure.
Figure 4B:
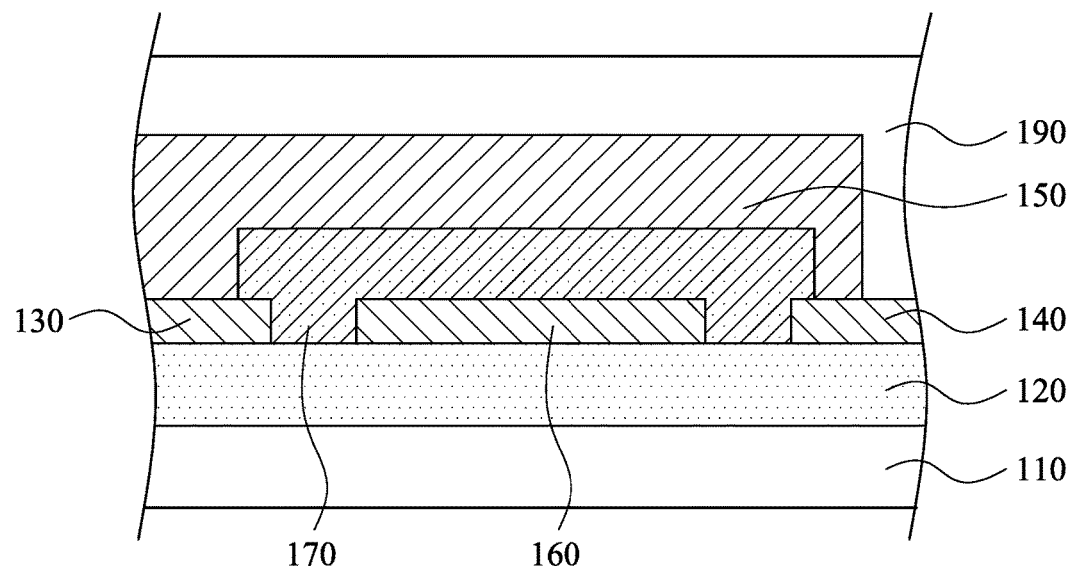
FIG. 4B is a cross-sectional view taking along line 4B-4B of FIG. 4A.

Reference is made to FIG. 4A and FIG. 4B. FIG. 4A is a partial enlarged view of a touch panel according to at least another embodiment of the present disclosure. FIG. 4B is a cross-sectional view taken along line 4B-4B of FIG. 4A. According to at least one embodiment, the touch panel further includes a shielding layer 160 disposed on the light-shielding element 120. The shielding layer 160 surrounds the discharge element 140 and is spaced apart from the discharge element 140 by a gap 165. The main bridge element 150 is electrically insulated from the shielding layer 160. For example, the touch panel may further include an insulating layer 170 disposed between the main bridge element 150 and the shielding layer 160 and configured for electrically insulating the main bridge element 150 from the shielding layer 160.

In greater detail, when electrostatic charges hit the touch sensing layer 130, the current will flow to the discharge element 140 through the main bridge element 150 because of the potential difference. If the current is too strong, the discharge element 140 is likely to explode due to the breakdown of discharge element 140. When the discharge element 140 breaks down, charges originally stored in the discharge element 140 will be absorbed by the shielding layer 160 so as to prevent the explosion from damaging the surrounding touch sensing layer 130.

In some embodiments, the shielding layer 160 is a conducting layer, which, for example, can be formed from the same conducting layer as the touch sensing layer 130 and the discharge element 140. However, in some other embodiments, the shielding layer 160, the discharge element 140, and the touch sensing layer 130 are made of different materials or by different processes. Additionally, a shape of the shielding layer 160 may be determined depending on a shape of the discharge element 140. Basically, any configuration in which the shielding layer 160 is able to surround the discharge element 140 is contemplated herein. In addition to that, the insulating layer 170 may be made of polyimide (PI) or some other suitable materials. In some embodiments, the insulating layer 170 and the insulating element 138 in FIG. 3A may be formed during a same process. Since other details are the same as those shown in FIGS. 2A and 2B, a repeat description in this regard is not provided.

Figure 5A:
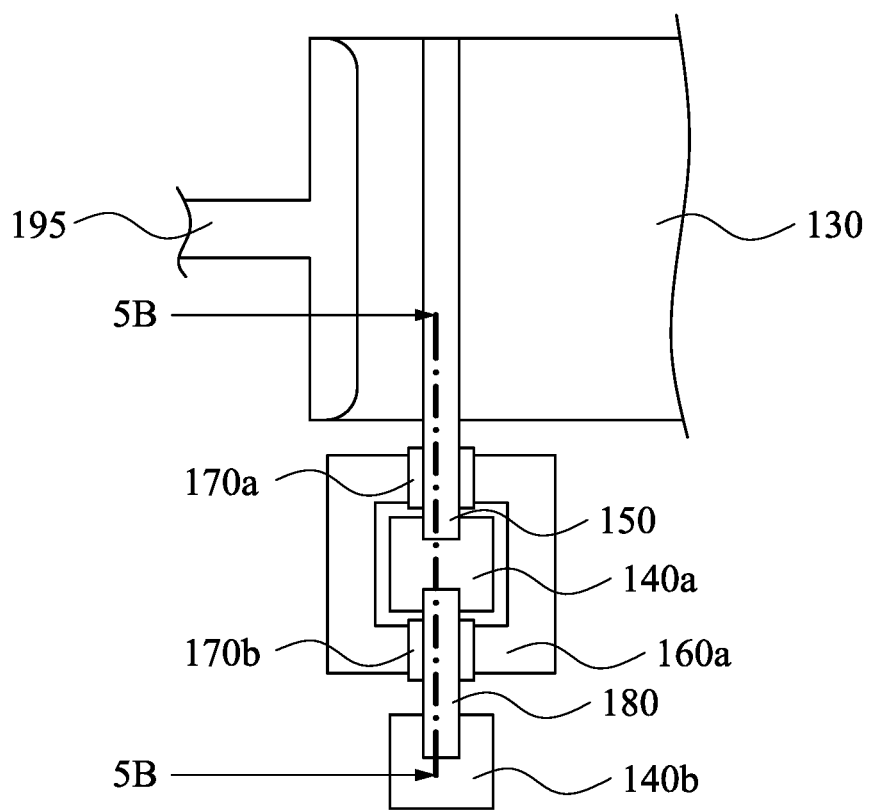
FIG. 5A is a partial enlarged view of a touch panel according to still at least another embodiment of the present disclosure.
Figure 5B:
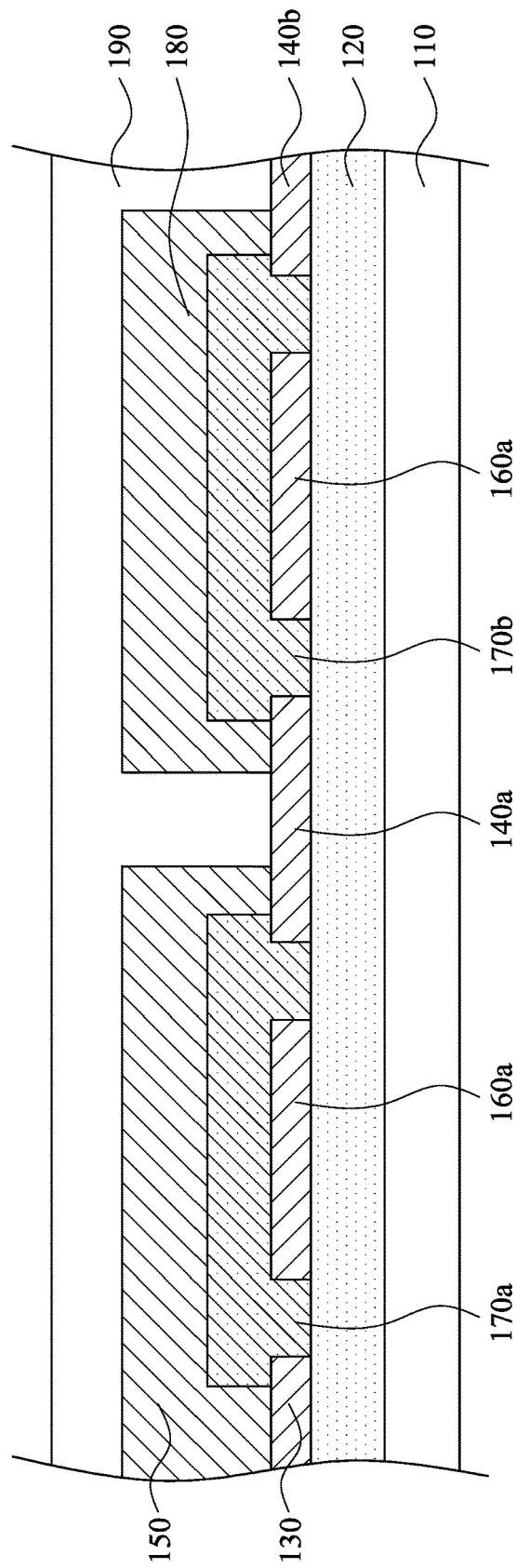
FIG. 5B is a cross-sectional view taking along line 5B-5B of FIG. 5A.

Reference is made to FIG. 5A and FIG. 5B. FIG. 5A is a partial enlarged view of a touch panel according to still another embodiment of the present disclosure. FIG. 5B is a cross-sectional view taken along line 5B-5B of FIG. 5A. According to at least one embodiment, the touch panel includes multiple the discharge elements, for example, two (that is, a discharge element 140a and a discharge element 140b), and the discharge element 140a and the discharge element 140b are separated from each other. In addition, the touch panel further includes a sub bridge element 180 connecting the two adjacent discharge elements 140a, 140b. For example, two opposite ends of the sub bridge element 180 are respectively disposed on the two adjacent discharge elements 140a and 140b. In at least one embodiment, the main bridge element 150 and the sub bridge element 180 are connected in series to connect the discharge elements 140a, 140b. Two opposite ends of the main bridge element 150 are respectively disposed on the touch sensing layer 130 and the discharge element 140a, and the two opposite ends of the sub bridge element 180 are respectively disposed on the discharge elements 140a and 140b. Although the main bridge element 150 and the sub bridge element 180 are arranged in a line according to at least one embodiment, the main bridge element 150 and the sub bridge element 180 may not be parallel to each other in some other embodiments.

When electrostatic charges hit the touch sensing layer 130, the current will first flow to the discharge element 140b through the main bridge element 150, the discharge element 140a, and the sub bridge element 180 because of the potential difference. The current is thus conducted away from the touch sensing layer 130. If the discharge element 140b explodes because of an excessive current, the current can flow to the discharge element 140a, which still can conduct the electrostatic charges away from the touch sensing layer 130.

Figure 6:
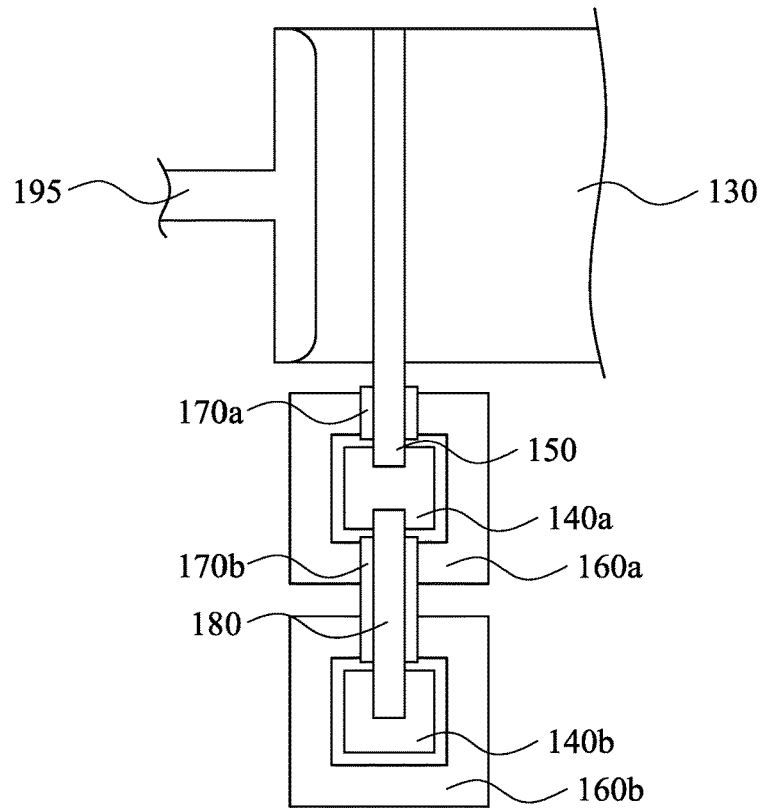
FIG. 6 is a partial enlarged view of a touch panel according to yet at least another embodiment of the present disclosure.

In at least one embodiment, the touch panel may include a shielding layer 160a, an insulating layer 170a, and an insulating layer 170b. The shielding layer 160a surrounds the discharge element 140a to prevent charges stored in the discharge element 140a from hitting and in turn damaging the touch sensing layer 130 when the discharge element 140a explodes. The insulating layer 170a is disposed between the bridge element 150 and the shielding layer 160a to electrically insulate the main bridge element 150 and the shielding layer 160a. The insulating layer 170b is disposed between the sub bridge element 180 and the shielding layer 160a to electrically insulate the sub bridge element 180 from the shielding layer 160a. In some other embodiments, as shown in FIG. 6, the touch panel further includes a shielding layer 160b surrounding the discharge element 140b to achieve the shielding effect. The insulating layer 170b can further extend between the shielding layer 160b and the sub bridge element 180 to electrically insulate the shielding layer 160b from the sub bridge element 180. In some other embodiments, the touch panel does not include the shielding layer or only includes the shielding layer 160a (160b). Or, a number of the shielding layers 160a (160b) is less than or equal to a number of the discharge elements 140a (140b) so that the shielding layers 160a (160b) respectively surround all or part of the discharge elements 140a (140b). Since other details of at least one embodiment are the same as those shown in FIGS. 2A and 2B, repeat description in this regard is not provided.

Figure 7:
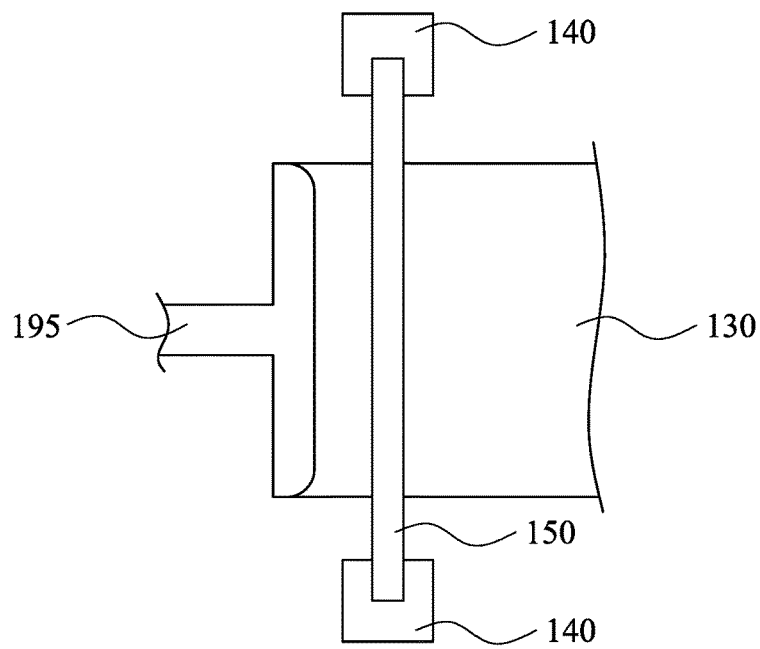
FIG. 7 is a partial enlarged view of a touch panel according to at least another embodiment of the present disclosure.

FIG. 7 is a partial enlarged view of a touch panel according to another embodiment of the present disclosure. According to at least one embodiment, the number of the discharge elements 140 is two. The two discharge elements 140 are isolated from each other and are respectively connected to the opposite two ends of the main bridge element 150. When electrostatic charges hit the touch sensing layer 130, the current is respectively conducted to the discharge elements 140 along the main bridge element 150 so as to greatly improve the discharge rate. In addition, since the current is split into two different paths, the chance that the discharge elements 140 break down because of the current is also reduced. Additionally, in some other embodiments, the touch panel may further include the above shielding layer 160, the insulating layer 170, and the sub bridge element 180, and numbers of the shielding layers, the insulating layers, and the sub bridge elements are determined depending on practical situations. Since other details of at least one embodiment are the same as those shown in FIGS. 2A and 2B, repeat description in this regard is not provided.

In summary, since the main bridge element is connected to the portion of the touch sensing layer disposed on the light-shielding element and the discharge element, the potential difference is generated between the touch sensing layer and the discharge element. Even though electrostatic charges hit the portion of the touch sensing layer on the light-shielding element, the current is able to rapidly flow to the discharge element having a lower potential along the main bridge element so as to avoid the damage of electrostatic charges to the touch sensing layer. In addition, since the current has flowed to the discharge element, the possibility that the touch sensing layer located between the edge area and the center area is damaged by the electrostatic charges is also reduced.

In some embodiments, the aforementioned discharge elements, the shielding layers, and the first sensing units of the touch sensing layer may be made of a same material and formed by a same process. The aforementioned insulating layers and the insulating element of the touch sensing layer may be made of a same material and formed by a same process. The aforementioned main bridge elements, the sub bridge elements, the wires, and the connection elements of the second sensing units may be made of a same material and formed during a same process. In other words, the electrostatic discharge structures according to the various embodiments of the present disclosure can be formed by the current process technology and in the current processes without the necessity to add process steps and increase the cost.

Although the disclosure has been described in considerable detail with reference to certain embodiments thereof, other embodiments are possible. Therefore, the spirit and scope of the appended claims should not be limited to the description of the embodiments contained herein.

What is claimed is:

1. A touch panel comprising:
   a substrate having a center area and an edge area surrounding the center area;
   a light-shielding element disposed on the edge area of the substrate;
   a touch sensing layer disposed on the substrate, wherein the touch sensing layer includes a plurality of sensing units and the ends of the sensing units are disposed on the light-shielding element;
   a plurality of discharge elements corresponding to the sensing units disposed on the light-shielding element and being separated from the touch sensing layer; and
   wherein each of the discharge elements is respectively connected to each of the ends of the sensing units by a main bridge element;
   wherein each of the discharge elements is surrounded by a shielding layer disposed on the light-shielding element; the shielding layer is spaced apart from each of the discharge elements by a gap; the shielding layer is located between the light-shielding element and the main bridge element, and the main bridge element is electrically insulated from the shielding layer.

2. The touch panel of claim 1, wherein the shielding layer is a conducting layer.

3. The touch panel of claim 1, wherein an insulating layer is disposed between the main bridge element and the shielding layer.

4. The touch panel of claim 1, wherein a plurality of the discharge elements are separated from one another, the touch panel further comprising:
   a sub bridge element connecting two of the discharge elements.

5. The touch panel of claim 4, wherein the main bridge element and the sub bridge element are connected in series to connect the discharge elements.

6. The touch panel of claim 4, further comprising:
   a shielding layer disposed on the light-shielding element, the shielding layer surrounding one of the discharge elements and being spaced apart from the one of the discharge elements by a gap, both the main bridge element and the sub bridge element being electrically insulated from the shielding layer.

7. The touch panel of claim 6, wherein the shielding layer is a conducting layer.

8. The touch panel of claim 6, further comprising:
   an insulating layer disposed between the sub bridge element and the shielding layer.

9. The touch panel of claim 6, wherein a plurality of the shielding layers respectively surround the discharge elements.

10. The touch panel of claim 1, wherein two of the discharge elements are separated from each other and are respectively connected to two opposite ends of the main bridge element.

11. The touch panel of claim 1, wherein the touch sensing layer comprises:
    a first sensing unit extending along a first direction, the main bridge element being connected to one end of the first sensing unit.

12. The touch panel of claim 11, wherein the first sensing unit comprises:
    a plurality of sensing pads, the main bridge element being connected to the sensing pad located at the one end of the first sensing unit; and
    a plurality of connection elements, each of the connection elements connecting the sensing pads, and the connection elements and the sensing pads being arranged alternately.

13. The touch panel of claim 12, wherein the sensing pads and the discharge element are made of a same material and formed in a same process.

14. The touch panel of claim 12, further comprising:
    a wire disposed on the light-shielding element and connected to the sensing pad located at the one end.

15. The touch panel of claim 11, wherein the touch sensing layer further comprises:
    a second sensing unit extending along a second direction intersecting the first direction.

16. The touch panel of claim 1, wherein the discharge element is a conducting layer.

* * * * *